(12) United States Patent
Farag et al.

(10) Patent No.: US 12,472,936 B2
(45) Date of Patent: Nov. 18, 2025

(54) METHOD OF DETERMINING PARKING AREA LAYOUT

(71) Applicant: Aptiv Technologies AG, Schaffhausen (CH)

(72) Inventors: Mohamed Farag, Cracow (PL); Dariusz Cieslar, Cracow (PL)

(73) Assignee: APTIV TECHNOLOGIES AG, Schaffhausen (CH)

( * ) Notice: Subject to any disclaimer, the term of this patent is extended or adjusted under 35 U.S.C. 154(b) by 199 days.

(21) Appl. No.: 18/183,649

(22) Filed: Mar. 14, 2023

(65) Prior Publication Data

US 2023/0331215 A1  Oct. 19, 2023

(30) Foreign Application Priority Data

Apr. 19, 2022 (GB) ...................................... 2205719

(51) Int. Cl.
  *B60W 30/06* (2006.01)
  *G01C 21/00* (2006.01)
  *G08G 1/14* (2006.01)

(52) U.S. Cl.
  CPC ......... *B60W 30/06* (2013.01); *G01C 21/3815* (2020.08); *G01C 21/3833* (2020.08); *G08G 1/141* (2013.01); *B60W 2556/40* (2020.02)

(58) Field of Classification Search
  CPC .............. B60W 30/06; B60W 2556/40; G01C 21/3815; G01C 21/3833; G08G 1/141
  (Continued)

(56) References Cited

U.S. PATENT DOCUMENTS 10,311,731 B1 *  6/2019  Li ........................... G08G 1/012
10,984,659 B2 *  4/2021  Sert ........................ G08G 1/141
(Continued)

FOREIGN PATENT DOCUMENTS

CN      111753649        10/2020
DE      102016206631 A1 * 10/2017  ............ B60W 40/02
(Continued)

OTHER PUBLICATIONS

Landsiedel,Christian,andDirkWollherr."RoadGeometryEstimationf orUrbanSemanticMapsUsingOpenData." Advanced robotics31. 5(2017):282-290.Web. (Year: 2017).*
(Continued)

*Primary Examiner* — Ramya P Burgess
*Assistant Examiner* — Keith A von Volkenburg
(74) *Attorney, Agent, or Firm* — Harness, Dickey & Pierce, P.L.C.

(57) ABSTRACT

Disclosed herein are methods of determining a layout for a parking area. In an aspect, a method includes determining environmental information about a surrounding environment of a vehicle moving in a parking area from sensing data provided by a sensing system of the vehicle; extracting parameters associated with parking slots identified from the environmental information; determining layout models for the parking area based at least on the extracted parameters, each layout model including an underlaying parking slot template; assigning to each of the determined layout models a confidence score; and selecting the layout model of the parking area having the highest confidence score as a current layout model used to determine the layout, the selected layout model is updated over time based on the confidence scores assigned to the layout models generated from sensing data collected while the vehicle is moving.

15 Claims, 4 Drawing Sheets

(58) Field of Classification Search
USPC .......................................................... 701/25
See application file for complete search history.

(56) References Cited

U.S. PATENT DOCUMENTS

| | | | |
|---|---|---|---|
| 11,062,602 B1* | 7/2021 | Beaurepaire | G08G 1/146 |
| 2011/0212717 A1* | 9/2011 | Rhoads | G06F 16/9537 |
| | | | 455/418 |
| 2014/0080428 A1* | 3/2014 | Rhoads | H04W 4/70 |
| | | | 455/88 |
| 2016/0267794 A1* | 9/2016 | Cogill | G08G 1/144 |
| 2018/0215374 A1* | 8/2018 | Lee | G05D 1/12 |
| 2018/0218605 A1* | 8/2018 | Mowatt | G08G 1/144 |
| 2018/0357907 A1* | 12/2018 | Reiley | G08G 1/005 |
| 2019/0139410 A1* | 5/2019 | Guseynov | G08G 1/0141 |
| 2019/0146509 A1* | 5/2019 | Dean | G05D 1/0214 |
| | | | 701/25 |
| 2020/0066155 A1* | 2/2020 | Rosenblatt | G08G 1/143 |
| 2020/0339195 A1 | 10/2020 | Feijoo et al. | |
| 2021/0253128 A1* | 8/2021 | Nister | G05D 1/646 |
| 2022/0082405 A1* | 3/2022 | Sumner | G01C 21/3682 |
| 2022/0107203 A1* | 4/2022 | Lawrence | G01C 21/3691 |
| 2022/0178715 A1 | 6/2022 | Golgiri et al. | |

FOREIGN PATENT DOCUMENTS

| | | | |
|---|---|---|---|
| FR | 3076795 A1 * | 7/2019 | G01S 15/86 |
| GB | 2561054 | 10/2018 | |
| IN | 201921051068 A * | 12/2019 | |

OTHER PUBLICATIONS

Singh, Gautam. "Visual Scene Understanding through Semantic Segmentation." ProQuest Dissertations & Theses, 2014. Print. (Year: 2014).*

Henry, C et al. "Citywide estimation of parking space using aerial imagery and osm data fusion with deep learning and fine-grained annotation." International Archives of the Photogrammetry, Remote Sensing & Spatial Information Sciences. XLIII-B2-2021. Gottingen: Copernicus GmbH, 2021. 479-485. Web. (Year: 2021).*

"Combined Search and Examination Report", GB Application No. 2205719.4, Oct. 14, 2022, 7 pages.

* cited by examiner

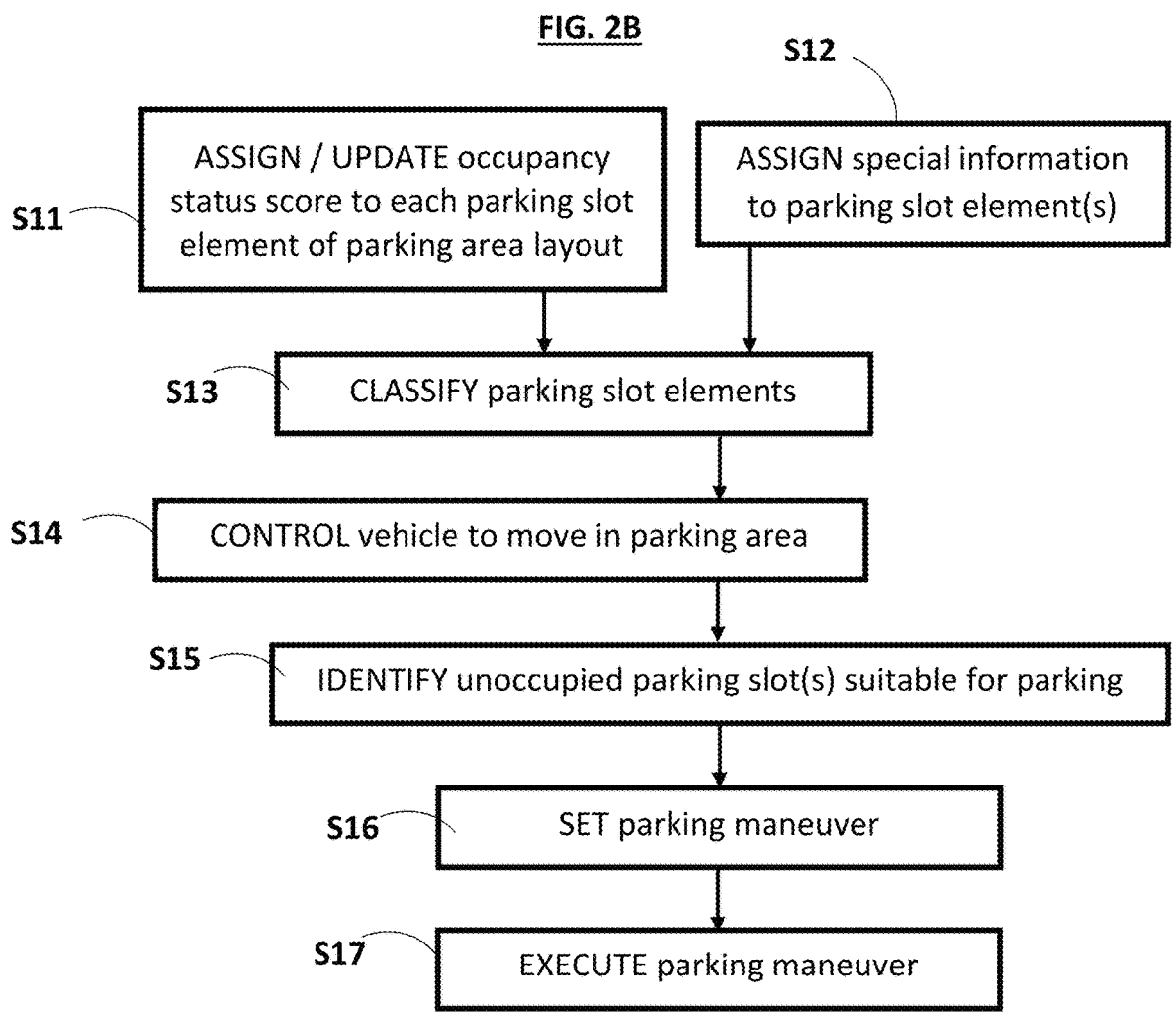

METHOD OF DETERMINING PARKING AREA LAYOUT

INCORPORATION BY REFERENCE

This application claims priority to United Kingdom Patent Application Number GB2205719.4, filed Apr. 19, 2022, the disclosure of which is incorporated by reference in its entirety.

BACKGROUND

In the automotive field, parking systems have been developed to control the vehicle in executing parking maneuvers in an automated manner or partially automated manner. The parking systems rely on multiple sensors, e.g. vision sensors, Lidar sensors, radar sensors, Global Navigation Satellite System (GNSS), and a perception stack to collect information about a surrounding environment of the vehicle, and detect a free or unoccupied parking slot, also termed as parking space. Once a free parking slot has been detected and confirmed, the parking system starts planning a parking maneuver and then controls at least partially the vehicle to execute the planned parking maneuver.

Before planning the parking maneuver, the parking system accumulates evidences of occupancy from the perception stack, post process the evidences of occupancy to detect gaps between occupied spaces and classify detected gaps as parking slots. After detection of a parking slot, the slot occupancy status is tracked and, if the slot is unoccupied, a path is planned to perform the parking maneuver to park the vehicle in the unoccupied parking slot.

The existing parking systems are effective in controlling the vehicle to perform automated or partially automated parking maneuvers. However, they have a high latency. The algorithms implemented for planning the parking maneuver have to wait for a confirmation that a detected gap is unoccupied and can fit the vehicle, which can generally be performed only after passing it by. As a result, the overall execution time for a parking maneuver controlled by the parking system is significantly increased.

The present disclosure allows to improve the situation. In particular, there is a need for facilitating maneuvers for a vehicle in a parking area.

SUMMARY

The present disclosure concerns a computer-implemented method of determining a layout for a parking area, comprising the following steps: determining environmental information about a surrounding environment of a vehicle from sensing data provided by a sensing system of said vehicle, while the vehicle is moving in the parking area; determining a layout for the parking area by performing the steps of: extracting one or more parameters associated with parking slots identified from the environmental information; determining one or more layout models for the parking area based at least on the extracted one or more parameters, each layout model comprising an underlaying parking slot template; assigning to each of the determined layout models a confidence score, indicating how the respective underlaying parking slot template matches the one or more parameters associated with the parking slots identified from the environmental information; and selecting the layout model of the parking area having the highest confidence score as a current layout model used to determine the parking area layout; wherein, the selected layout model is updated over time based on the confidence scores assigned to the layout models generated from sensing data collected while the vehicle is moving.

The determined parking area layout can be used to control one or more functions of the vehicle. For example, the determined parking area layout can be used by a path planning module of the vehicle, to better plan a trajectory within the parking area for the vehicle. The vehicle can be controlled to move along the planned trajectory in an automated or at least partially automated manner. This allows faster, smoother and more secure maneuvers of the vehicle in the parking area.

Advantageously, the determined parking area layout is used to control a driving trajectory of the vehicle and/or an Advanced Driver Assistance Systems (ADAS) control function.

For example, the method may also include a step of controlling the vehicle to move along a driving trajectory planned using the determined parking area layout, in an automated or partially automated manner.

In an embodiment, the method may further include a step of assigning an occupancy status score to each of a plurality of parking slot elements of the layout of the parking area, indicating a probability of occupancy of said parking slot, and updating the occupancy status scores based on the environmental information.

In an embodiment, a score indicating an unoccupied status may be assigned by default to each of the parking slot elements of the layout of the parking area, unless the environmental information provides an occupancy indication for said parking slot element.

Advantageously, the method may further include a step of identifying an unoccupied parking slot based on the occupancy status score assigned to each of the plurality of parking slot elements, and a step of determining a parking maneuver to park the vehicle in the identified unoccupied parking slot. The method may also include a step of controlling the vehicle to execute the set parking maneuver in an automated or partially automated manner.

The identification of an unoccupied parking slot by using the parking area layout built based on a layout model allows to reduce the parking maneuver latency. In other words, the execution time of a parking maneuver executed by the vehicle in an automated or partially automated manner is significantly decreased. The detection of an unoccupied parking slot can be performed earlier than in the prior art, since it is no longer necessary to pass by the unoccupied parking slot to start a parking maneuver. Furthermore, the parking maneuver can be significantly simplified by planning a smoother and simpler trajectory for the vehicle.

The present method has another advantage that it does not require specific sensors and/or specific perception means.

In an embodiment, the one or more parameters associated with an identified parking slot, extracted from the environmental information, includes at least one of the following elements: a position of the identified parking slot relative to the vehicle; one or more dimensions of the identified parking slot; an orientation of the identified parking slot.

In an embodiment, updating over time the layout of the parking area includes generating over time first parking slot elements representing parking slots already identified from the environmental information, and predicting second parking slot elements corresponding to parking slots foreseen based on the parking slots already identified from the environmental information and the current layout model.

The parking area layout can extend beyond the parking slots that have already been identified or detected, by addition of parking slots predicted, or extrapolated, based on the layout model and the parking slots already identified. This allows an earlier estimation of parking slots location, which can reduce significantly the complexity of the parking maneuver by planning a simpler trajectory. It is not guaranteed that a predicted or foreseen parking slot exists and is unoccupied. But the parking slot will be confirmed or not confirmed later once more environmental information has been obtained.

Advantageously, predicting the second parking slot elements includes placing, or adding, parking slot elements outside of a sensing area covered by the sensing system of the vehicle within the parking area layout.

The present disclosure also concerns a computer program comprising instructions which, when the program is executed by a computer, cause the computer to carry out the method previously defined; a computing system comprising means adapted to execute the steps of the method; and a vehicle including the computing system.

BRIEF DESCRIPTION OF THE DRAWINGS

Other features, purposes and advantages of the disclosure will become more explicit by means of reading the detailed statement of the non-restrictive embodiments made with reference to the accompanying drawings.

FIGS. 2A and 2B show a flowchart of a method of determining a layout for a parking area, according to an embodiment.

DETAILED DESCRIPTION

Disclosed herein are methods of determining a layout for a parking area. The parking area may be a parking lot or a region of a parking lot. Such a method can be used for example by a vehicle to determine a parking area layout and control the vehicle to move within the parking area based on the parking area layout, in an automated or partially automated manner.

Figure 1:
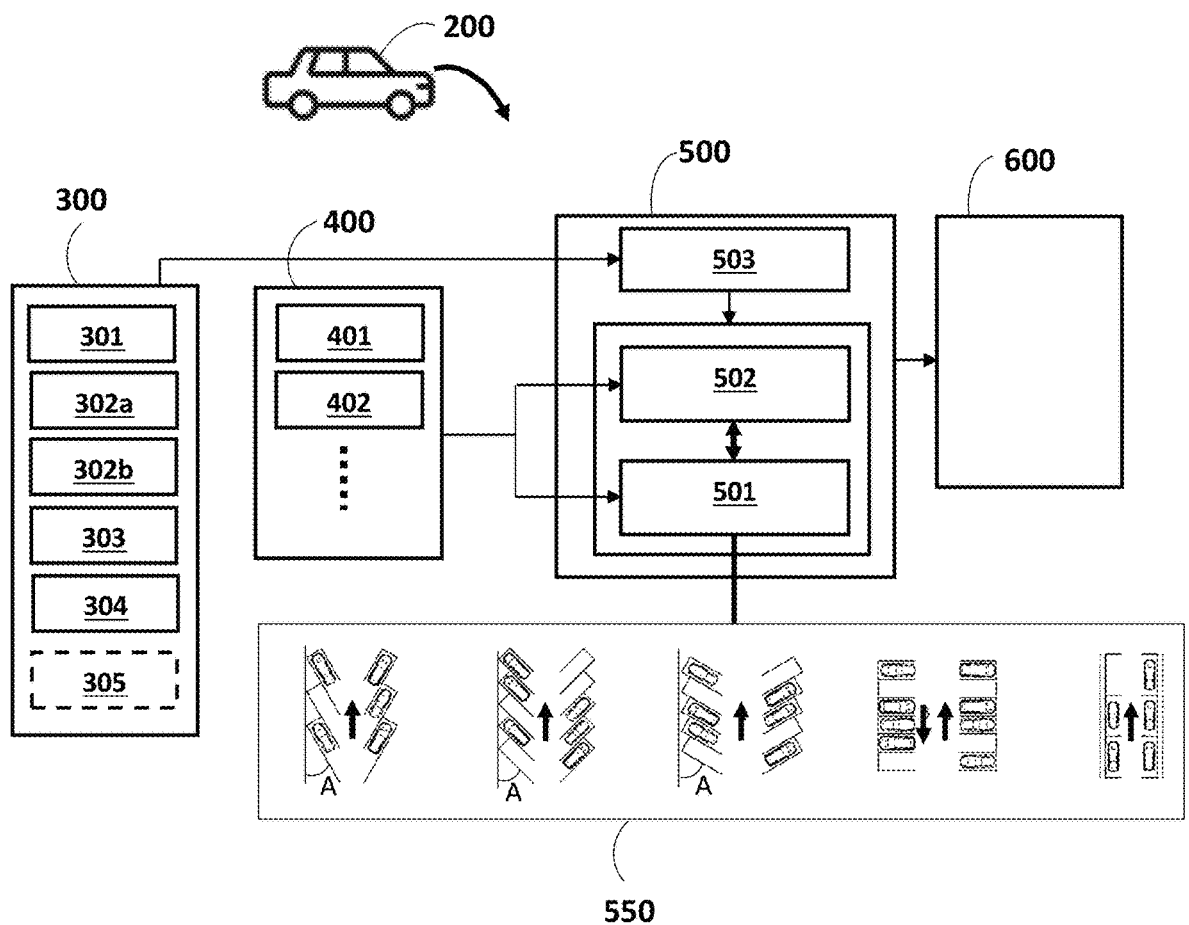
FIG. 1 schematically represents a vehicle including a computing system of determining a parking area layout, according to an embodiment.

FIG. 1 shows a schematic functional block diagram of a vehicle 200.

The vehicle 200 includes a sensing system 300 in charge of sensing data in a surrounding environment of the vehicle 200. The sensing system 300 may comprise multiple sensors, preferably of different types, such as radar sensor(s) 301, vision sensor(s) 302, ultrasonic sensor(s) 303, and/or lidar sensor(s) 304, etc. The vision sensors 302 may for example include one or more forward vision sensors 302a and one or more surround vision sensors 302b.

Optionally, the sensing system 300 may further include a semantic layer, or function, or module, 305 responsible for determining semantic data from data provided by the sensors 301-304. The semantic data includes semantic information about the environment around the vehicle 200, in other words information in a syntactic form. It may relate for example to a traffic sign, a traffic regulation, a disabled parking slot, etc. The semantic layer 305 may be implemented by software and hardware.

The vehicle 200 may further include a perception stack or perception module 400. The perception stack 400 is responsible for determining environmental information related to the surrounding environment of the vehicle 200 using sensing data provided by the sensing system 300. It may implement algorithms and/or applications and/or functions for processing sensing data from the sensing system 300 to determine environmental information about the surrounding environment of the vehicle 200. The perception stack 400 may have a plurality of perception layers implementing respective algorithms and/or applications and/or functions for processing the sensing data to determine various information about the surrounding environment of the vehicle 200. For example, the perception stack 400 may include: an occupancy grid map generator 401 for generating an occupancy grid map of the surrounding environment of the vehicle 200 from the sensing data; and an object tracker 402 for identifying and tracking dynamic objects in the surrounding environment of the vehicle 200 from the sensing data.

The perception stack 400 may be implemented by software and hardware. The perception layers may use algorithms such as machine learning algorithms.

In the present disclosure, the vehicle 200 further includes a system 500 for tracking a parking area. The parking area can be a parking lot or a region, or part, of the parking lot. The parking area tracking system 500 has a function of determining a layout for a parking area. Optionally, the system 500 may have another function of determining unoccupied or free parking slots, also termed as parking spaces, that are locations designated for parking, in a parking area.

A layout of a parking area, or a parking area layout, is a schematical representation of the parking area, for example in geometric shapes. It includes parking slot elements representing respective parking slots of the parking area. Each parking slot element may have a predetermined geometric shape, for example a U shape or a rectangular shape. The parking area layout may also include one or more aisle elements representing aisles, or traffic lanes, that are designated for moving within the parking lot or area.

The parking area tracking system 500 may include a parking area layout tracker 501 and a parking slot tracker 502.

The parking area layout tracker 501 is responsible for determining and updating over time, or tracking, a layout for a parking area, as described later in the method.

It should be noted that a parking area may use different arrangements of parking slots in different parking areas or regions, respectively. For example, a parking area may use perpendicular parking in a main parking area and, in supplement, parallel parking in a limited parking area. The parking area layout tracker 501 may determine a parking area layout for each parking area, or region, using a specific arrangement of parking slots.

The parking slot elements tracker 502 is responsible for determining and updating over time, or tracking, the parking slot elements of the parking area layout, as described later in the method.

The parking area tracking system 500 may further include, or be connected to, a database 550 of predefined parking lot layout models. Most of parking lots are designed, or arranged, in compliance with known parking arrangements. There are at least three main types, or categories, of parking: parallel, perpendicular and angle. In the parallel type, each parking slot is parallel to the direction in which a vehicle is approaching the parking slot. In the perpendicular type, each parking slot is perpendicular to the direction in which a vehicle is approaching the parking slot. In the angle type, each parking slot forms an angle A with the direction in which a vehicle is approaching the parking slot represented by an arrow in FIG. 1. The angle type may have multiple variants depending on the angle. The most common angles used in the angle type parking areas are 30°, 45° and 60° for the acute angle A.

FIG. 1 shows five different predefined parking lot layout models of different types including one parallel type, one perpendicular type, and three angle types for the three respective acute angles A of 30°, 45° and 60°. The database 550 may further include, for each type of parking, multiple variants defined by different slot dimensions of the parking slot. The slot dimensions include for example a slot width and a slot length. Each parking lot layout model may be associated with a parking slot template. In other words, each parking layout model may comprise an underlaying parking slot template. Each parking slot template may be characterized by a plurality of features including for example at least one of: an angle of parking (e.g., 0°, 30°, 45°, 60° or 90°); a slot width; or a slot length.

The slot length may be a usable length of the parking slot, in other words the effective length that can be used by a vehicle to park.

Optionally, the parking area tracking system 500 may further include a semantic processing module 503 having the function of gathering semantic information about the surrounding environment of the vehicle 200 either from sensors 301-304, and/or from the semantic layer 305, and/or from the perception stack 400, and the function assigning special semantic information to parking slots and optionally to the layout. For example, if a special slot such as a parking slot for disabled person is sensed, the information "parking slot for disabled person" is assigned to the parking slot by the semantic processing module 503. The parking slot tracker 502 may be configured to reject the parking slot, based on the information "parking slot for disabled person", even if the slot is free, or unoccupied, as the vehicle 200 is not authorized to park in such a special slot.

The parking area tracking system 500 may be implemented by software and hardware.

The vehicle 200 may be an autonomous vehicle or at least partially automated vehicle.

In an embodiment, the vehicle 200 may further comprise an automatic parking system 600 configured to at least partially control the vehicle 200 to move in a parking area and/or perform a parking maneuver to park into a parking spot. The automatic parking system 600 may use information or data provided at the output of the parking area tracking system 500, as explained in the method described later. The automatic parking system 600 may be implemented by software and hardware.

The perception stack 400, the parking area tracking system 500 and/or the automatic parking system 600 may be implemented on a same processor or controller, or on different processors or controllers.

Figure 2A:
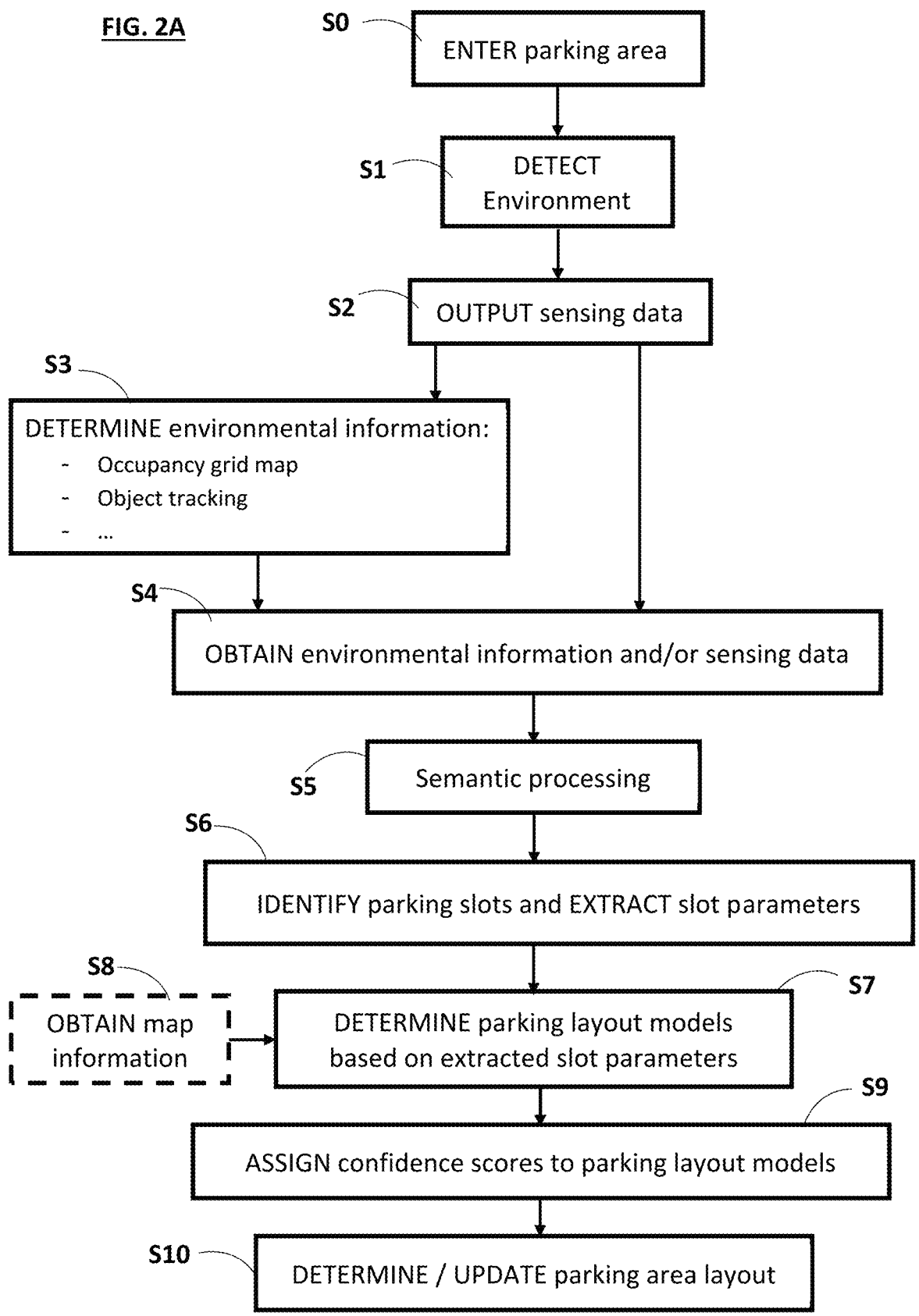

A computer-implemented method of determining a parking layout for a parking area, according to an embodiment, will now be described with reference to FIGS. 2A, 2B, and 3. A parking area may designate a parking lot or a region, or sub-area, of the parking lot.

Let's consider that the vehicle 200 enters a parking area 700, in a step S0, and is moving in the parking area 700.

In a step S1 of detection of the environment, the sensing system 300 of the vehicle 200 collects information about a surrounding environment of the vehicle 200 with the sensors 301-304 in real time. In other words, the sensing system 300 monitors, senses in real time the surrounding environment or surrounding area of the vehicle with the sensors 301-304 of the vehicle 200. The step S1 may be performed while the vehicle 200 is moving in the parking area 700.

The sensing system 300 outputs sensing data, in a step S2. The sensing data may include raw, or unprocessed, data and/or pre-processed data provided by the sensors 301-304. Optionally, the sensing data may include semantic data about the surrounding environment of the vehicle 200, provided by the semantic layer 305. Optionally, one or more sensors 301-304 may have the capacity to determine semantic information from sensing data. The sensing data contains information about the environment surrounding the vehicle 200.

At least part of the sensing data may be received as input by the perception stack or perception module 400. In a step S3, the sensing data may be processed by the perception stack 400 to determine environmental information about the surrounding environment of the vehicle 200.

In an embodiment, in the step S3, the occupancy grid map generator 401 may generate an occupancy grid map related to the environment surrounding the vehicle 200. The occupancy grid map represents a map of an area surrounding the vehicle 200 as an evenly spaced field of binary random variables each representing the presence of an obstacle at that location in the area.

In the step S3, the object tracker 402 may identify and track dynamic objects in the environment surrounding the vehicle 200.

The environmental information is continuously determined, updated, in real time by the perception stack 400 from the sensing data continuously provided by the sensing system 300 in real time.

In a reception step S4, the parking area tracking system 500 obtains, or receives, the environmental information about the surrounding environment of the vehicle 200, provided by the perception stack 400.

Additionally, or alternatively, in the reception step S4, the parking area tracking system 500 may directly receive at least part of the sensing data from the sensing system 300, and process the received sensing data to determine environmental information about the environment surrounding the vehicle 200.

In an embodiment, in a step S5, the semantic processing layer 503 of the parking area tracking system 500 may gather semantic information from the sensors 301-304, and/or the semantic layer 305, and/or the perception stack 400, and provide it to the parking area layout tracker 501 and to the parking slot tracker 502.

In a step S6, the parking area layout tracker 501 may identify, or detect, parking slots in the environment around the vehicle 200 from the environmental information, obtained from the perception stack 400 and/or the semantic processing layer 503 and/or the sensing system 300. The tracker 501 may extract one or more parameters associated with identified parking slots from the environmental information, by data analysis. For example, the parking area layout tracker 501 may identify or detect road surface markings delineating the parking spots and/or parked vehicles and/or occupied parking slots and/unoccupied parking slots, based on the obtained environmental information. The extracted parameters associated with the identified parking slots may include, for each identified parking slot, at least part of the following features: a slot position relative to the vehicle 200, a slot width, a slot length, a parking orientation (e.g., parallel, perpendicular or angle) and/or a parking angle. Some extracted parameters might not be very accurate, and be quantified by a range of values.

Then, in a step S7, the parking area layout tracker 501 determines one or more parking layout models for the parking area based on the extracted one or more parameters. As previously indicated, in the database 550, each layout model includes an underlaying parking slot template. The one or more extracted slot parameters associated with the one or more parking slots identified in the step S6 may be used as filter or selection criteria to retrieve one or more parking layout models from the database 550. A selection of one or more parking layout models in the database 550 may thus be performed by only selecting the parking layout model(s) whose underlaying parking slot template matches at least partially the extracted parameter(s). The parking layout models from the database 550, whose parking slot templates do not match any parameter extracted from the environmental information, may be excluded from the selection.

Optionally, in a step S8, the parking area layout tracker 501 may obtain map information related to a current location of the vehicle 200. The map information may be used as an additional filter or selection criteria to select one or more parking layout models in the database 550, in the step S7. The map information may be received from an online mapping platform to which the vehicle 200 is connected through a mobile communication network, and/or from a mapping application installed on the vehicle 200.

Optionally, determining one or more parking layout models for the parking area may be further based on the semantic information about the surrounding environment of the vehicle.

In a step S9, the parking area layout tracker 501 assigns a confidence score to each of the parking layout models determined in the step S7. The confidence score assigned to each parking layout model indicates how the corresponding underlaying parking slot template matches the one or more extracted parameters of the parking slots identified from the environmental information. In other words, the confidence score assigned to each parking layout model quantifies a correspondence, a matching, between the parking slot template of this parking layout model and the one or more extracted slot parameter. The computation of the confidence score can be executed by a computation algorithm for example based on an algorithm known as "intersection over union" that gives similarity values or coefficients from 0 to 1 and measures similarity between two sample sets or objects for object detection in images. The computation algorithm may measure similarity between the parking slot template and the identified parking slot in terms of orientation and/or dimensions. For each parking layout model, a similarity coefficient may be computed for each identified or detected parking slot. Then, an overall score can be calculated by combining the scores obtained for a plurality of identified parking slots, which gives the confidence score assigned to this parking layout model.

The method further comprises a step S10, performed by the parking layout tracker 501, of selecting and updating over time a layout model for the parking area, based on the confidence scores assigned to the one or more parking layout models. In the step S10, the parking layout tracker 501 selects the layout model of the parking area having the highest confidence score as a current layout model. The selected layout model is updated over time, by the parking layout tracker 501, based on the confidence scores assigned to the layout models generated from sensing data collected while the vehicle is moving.

In the step S10, the current parking layout model is used by the parking layout tracker 501 to build, or determine, the parking area layout. In some embodiments, all the features of the parking area layout may be derived from the current parking layout model. In other embodiment, some features of the parking area layout may be derived from the extracted parameters of the identified parking slots. For example, the parking area layout may be based on a basic parking layout model, like one of the five models shown in FIG. 1, but have a slot width and a slot length determined from the extracted parameters.

The step S10 may be continuously executed in real time.

The steps S1 to S10 are performed in real time, continuously. While the vehicle 200 is moving in the parking area 700, its sensing system 300 continuously collects information about the surrounding environment of the vehicle 200. In this way, the parking area tracking system 500 gets more and more environmental information about the surrounding environment of the vehicle 200 over time. Over time, more and more parking slots can be identified in the step S6, and the extracted slot parameters can become more and more precise. In the step S9, the confidence scores assigned to the one or more parking layout models are updated over time and are more and more reliable. This allows the parking area layout tracker 501 to converge over time to the correct parking layout model.

Figure 3:
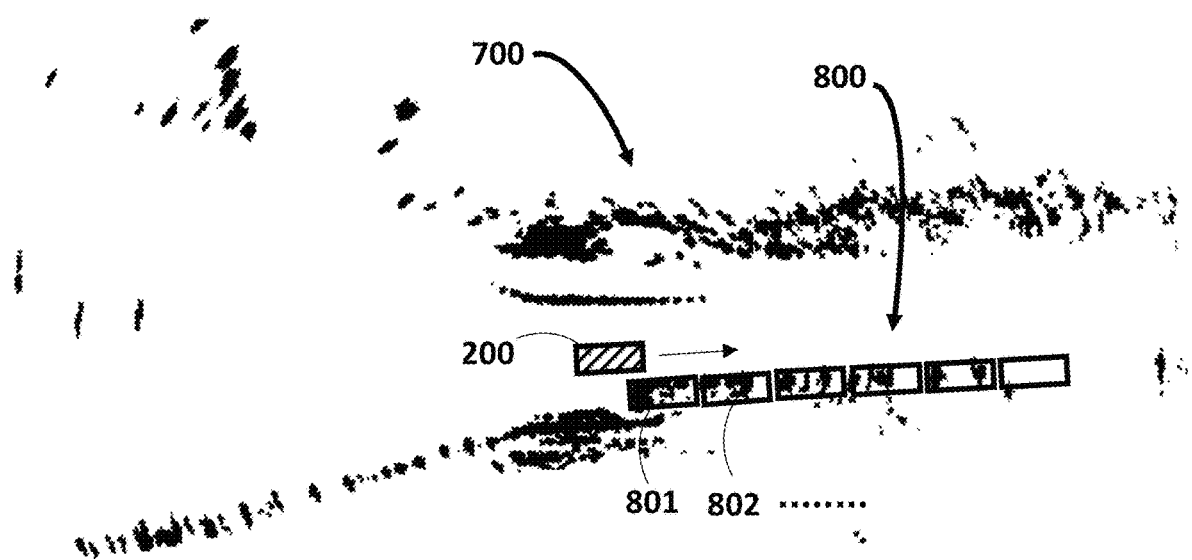
FIG. 3 illustrates an example of a parking area layout determined using the method of FIG. 2.

FIG. 3 represents an example of a parking area layout 800 including a plurality of parking slot elements 801, 802, . . . , representing parking slots of the parking area 700. In FIG. 3, the parking area layout 800 is superimposed on an occupancy grid map. In an embodiment, the parking slot elements may include: first parking slot elements, representing parking slots identified by the parking area layout tracker 501 from the obtained environmental information; and second parking slot elements, corresponding to parking slots foreseen, or predicted, or extrapolated, by the parking area layout tracker 501, based on the parking slots already identified from the obtained environmental information and the current parking layout model.

The prediction, or extrapolation, of the second parking slot elements may use environmental information and/or map information, for example a road curve, and/or the presence of building(s) in the area, and/or the presence of a wall at a certain distance to the vehicle 200, etc., to adjust the prediction or extrapolation.

Thus, the step S10 may include: generating the first parking slot elements representing the parking slots already identified from the obtained environmental information; and/or predicting the second parking slot elements foreseen or extrapolated based on the parking slots already identified from the obtained environmental information and the current parking layout model.

Predicting the second parking slot elements may include adding or placing parking slot elements outside of a sensing area covered by the sensing system 300 of the vehicle 200, in the parking area layout 800.

The determined parking area layout may be used to control one or more functions of the vehicle 200. In some embodiments, the determined parking area layout may be used to control a driving trajectory of the vehicle 200 and/or an Advanced Driver Assistance System, or ADAS, control function. For example, the parking area layout 800 may be used by the automatic parking system 600, and/or by an automated driving system, of the vehicle 200 to control the vehicle 200 to move within the parking area 700 in an automated manner or partially automated manner. Thus, the method may include a step of controlling one or more functions of the vehicle 200 moving in the parking area 700 in an automated or partially automated manner, by using the parking area layout 800. This allows to facilitate and secure the action of driving the vehicle 200 in the parking area 700.

In an embodiment, the method may further include a step S11 of assigning an occupancy status score to each of the plurality of parking slot elements 801, 802, . . . of the parking area layout 800, and updating the occupancy status scores, based on the obtained environmental information. The step S11 may be continuously performed by the parking slot tracker 502, in real time. The occupancy status score of each parking slot element 801, 802, . . . of the parking area layout 800 indicates a probability of occupancy of the corresponding parking slot of the parking area 700.

In a particular embodiment, a score indicating an unoccupied status may be assigned by default to each of the parking slot elements 801, 802, . . . of the parking area layout 800, unless the obtained environmental information provides an occupancy indication, or evidence, for the corresponding parking slot. The occupancy indication can be the indication that a vehicle is parked in the parking slot, or an object is detected in the parking slot, or a part of a vehicle is detected in the parking slot.

The occupancy grid map produced by the generator 401 may also give evidence about free, or unoccupied, space in a certain area. The parking slot tracker 502 may rely on such information to determine if the area can be considered as unoccupied, or unknown, or occupied, and assign occupancy status scores to the parking slot elements.

The parking slot tracker 502 may also use the output of the semantic processing module 503 to assign special information to parking slot elements of the parking layout 800, for example the information that the parking slot is for a disabled person, in an optional step S12.

In a step S13, the parking slot tracker 502 may optionally perform a semantic classification of the parking slot elements 801, 802, . . . of the parking area layout 800, into different categories, based on the scores assigned to the parking slot elements and optionally special information received from the semantic processing module 503. The different categories may include at least part of the following categories: unoccupied parking slot, occupied parking slot, unknown status, and/or special parking slot, for example parking slot for disabled person.

The step S11, and the optional steps S12, S13 are continuously performed in real time, based on the environmental information continuously obtained. Thus, the occupancy status scores of the parking slot elements 801, 802, . . . of the parking area layout 800 are continuously updated in real time, based on the environmental information continuously obtained.

The automatic parking system 600 may have been initiated by a user, for example when the vehicle 200 enters the parking area 700.

In an optional step S14, the automatic parking system 600 may control the vehicle 200 to move in the parking area to search for an unoccupied parking slot suitable for parking, in an automated or at least partially automated manner, based on the parking area layout 800.

The method may further include a step S15, performed by the parking slot tracker 502, of identifying at least one unoccupied parking slot suitable for parking in the parking area 700, based on the occupancy status score assigned to each of the plurality of parking slot elements of the parking area layout 800 and/or based on the result of the classification of the parking slot elements performed in the step S13. This can be performed by comparing the occupancy status score of each parking slot element with a predetermined threshold, and/or based on the parking slot categories resulting from the classification.

In a step S16, after identification or detection of at least one unoccupied parking slot suitable for parking in the parking area 700 in the step S13, the automatic parking system 600 may set or plan a parking maneuver to park the vehicle 200 in the unoccupied parking slot. If a plurality of unoccupied parking slots suitable for parking has been detected, the automatic parking system 600 may select one of them, for example the unoccupied parking slot closest to the vehicle 200.

Then, in a step S17, the automatic parking system 600 may control the vehicle 200 to execute the parking maneuver set or planned in the step S16, to park the vehicle 200 in the unoccupied parking slot, in an automated or partially automated manner. The parking maneuver may at least include a movement of the vehicle 200 consisting in approaching the unoccupied parking slot, used as a target parking slot. While the vehicle 200 is approaching this target parking slot, the parking area layout and the occupancy status scores of the parking slot elements are updated continuously, in real time. It may happen that the target parking slot for the parking maneuver be finally identified as an occupied parking slot. In that case, the automatic parking system 600 repeats the steps S13 and S15 to park the vehicle 200 in another parking slot.

The parking area layout may be displayed on a display apparatus of the vehicle 200. It may be superimposed on a map representing the environment of the vehicle 200. The parking area layout displayed on the display apparatus may be used by a driver to facilitate the maneuvers in the parking area 700.

The method may further include a step of generating a map based on the parking area layout. This map may be displayed on a display apparatus of the vehicle. The parking slot elements of the parking area layout may be classified into three categories based on their occupancy status scores: unoccupied, occupied, unknown. The three categories may be represented by different colors on the display apparatus.

The present disclosure also concerns: a computer program comprising instructions which, when the program is executed by a computer, cause the computer to carry out the method previously defined; a computer-readable data medium having stored thereon the computer program above defined; a computing system having means adapted to execute the steps of the method previously described; a vehicle including the above-defined computing system; a computer-readable storage medium including instructions that when executed configure a computing system to execute the steps (operations) of the method previously described; and an apparatus including: a processor; and a computer-readable storage medium having stored thereon instructions that, responsive to execution by the processor, cause the processor to execute the operations of the method previously described. A computer-readable medium may be non-transitory.

The use of "example," "advantageous," and grammatically related terms means "serving as an example, instance, or illustration," and not "preferred" or "advantageous over other examples." Items represented in the accompanying figures and terms discussed herein may be indicative of one or more items or terms, and thus reference may be made interchangeably to single or plural forms of the items and terms in this written description. The use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"), unless the context clearly dictates otherwise. Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, c-c-c, or any other ordering of a, b, and c).

What is claimed is:

1. A method comprising:
    determining environmental information about a surrounding environment of a vehicle from sensing data provided by a sensing system of the vehicle, while the vehicle is moving in a parking area, the determined environmental information includes at least one of:
        generating an occupancy grid map of the environment of the vehicle;
        performing object tracking in the environment of the vehicle;
        obtaining semantic information on the environment of the vehicle; or
        performing a semantic classification of parking slots into different categories;
    determining a layout for the parking area by:
        extracting one or more parameters associated with parking slots identified from the environmental information by data analysis, the one or more parameters includes at least one of the following elements:
            a position of the identified parking slot relative to the vehicle;
            one or more dimensions of the identified parking slot; or
            an orientation of the identified parking slot;
        determining one or more layout models for the parking area based on at least one of the extracted one or more parameters, each layout model comprising an underlaying parking slot template, wherein the extracted one or more parameters are used to select one or more predefined parking lot layout models retrieved from a database to determine the one or more layout models for the parking area;
        assigning to each of the determined layout models a confidence score, the confidence score indicating how the respective underlaying parking slot template matches the one or more parameters associated with the parking slots identified from the environmental information;
        selecting the layout model of the parking area having the highest confidence score as a current layout model used to determine the parking area layout;
        updating only the selected current layout model over time based on the confidence scores assigned to the layout models generated from sensing data collected while the vehicle is moving; and
        based on the updated layout model for the parking area, at least one of (a) automatically driving the vehicle within the parking area and (b) automatically parking the vehicle within a parking slot within the parking area.

2. The method according to claim 1, further comprising: assigning an occupancy status score to each of a plurality of parking slot elements of the layout of the parking area.

3. The method according to claim 2, further comprising: indicating a probability of occupancy of the parking slot.

4. The method according to claim 3, further comprising: updating the occupancy status scores based on the environmental information.

5. The method according to claim 4, wherein a score indicating an unoccupied status is assigned by default to each of the parking slot elements of the layout of the parking area, unless the environmental information provides an occupancy indication for the parking slot element.

6. The method according to claim 4, further comprising: identifying an unoccupied parking slot based on the occupancy status score assigned to each of the plurality of parking slot elements.

7. The method according to claim 6, further comprising: determining a parking maneuver to park the vehicle in the identified unoccupied parking slot.

8. The method according to claim 1, wherein updating over time the layout of the parking area further comprises: generating over time first parking slot elements representing parking slots already identified from the environmental information.

9. The method according to claim 8, wherein updating over time the layout of the parking area further comprises: predicting second parking slot elements corresponding to parking slots foreseen based on the parking slots already identified from the environmental information and the current layout model.

10. The method according to claim 9, wherein predicting the second parking slot elements further comprises: placing parking slot elements outside of a sensing area covered by the sensing system of the vehicle within the parking area layout.

11. The method according claim 1, wherein determining the one or more layout models further comprises: retrieving the one or more layout models from a database storing a plurality of predefined layout models.

12. The method according to claim 1, wherein determining the one or more layout models for the parking area is further based on the semantic information about the surrounding environment of the vehicle.

13. A non-transitory computer-readable storage medium comprising instructions that when executed configure a computing system to:
    determine environmental information about a surrounding environment of a vehicle from sensing data provided by a sensing system of the vehicle, while the vehicle is moving in a parking area, the determined environmental information includes at least one of:
        generating an occupancy grid map of the environment of the vehicle;
        performing object tracking in the environment of the vehicle;
        obtaining semantic information on the environment of the vehicle; or
        performing a semantic classification of parking slots into different categories;
    determine a layout for the parking area by:
        extracting one or more parameters associated with parking slots identified from the environmental information by data analysis, the one or more parameters includes at least one of the following elements:
            a position of the identified parking slot relative to the vehicle;
            one or more dimensions of the identified parking slot; or
            an orientation of the identified parking slot;

determine one or more layout models for the parking area based on at least one of the extracted one or more parameters, each layout model comprising an underlaying parking slot template, wherein the extracted one or more parameters are used to select one or more predefined parking lot layout models retrieved from a database to determine the one or more layout models for the parking area;

assign to each of the determined layout models a confidence score, the confidence score indicating how the respective underlaying parking slot template matches the one or more parameters associated with the parking slots identified from the environmental information; and select the layout model of the parking area having the highest confidence score as a current layout model used to determine the parking area layout;

update only the selected current layout model over time based on the confidence scores assigned to the layout models generated from sensing data collected while the vehicle is moving; and based on the updated layout model for the parking area, at least one of (a) automatically drive the vehicle within the parking area and (b) automatically park the vehicle within a parking slot within the parking area.

14. A computing system configured to:

determine environmental information about a surrounding environment of a vehicle from sensing data provided by a sensing system of the vehicle, while the vehicle is moving in the parking area, the determined environmental information includes at least one of:
  generating an occupancy grid map of the environment of the vehicle;
  performing object tracking in the environment of the vehicle;
  obtaining semantic information on the environment of the vehicle; or
  performing a semantic classification of parking slots into different categories;

determine a layout for the parking area by:
  extract one or more parameters associated with parking slots identified from the environmental information by data analysis, the one or more parameters includes at least one of the following elements:
    a position of the identified parking slot relative to the vehicle;
    one or more dimensions of the identified parking slot; or
    an orientation of the identified parking slot;
  determine one or more layout models for the parking area based on at least one of the extracted one or more parameters, each layout model comprising an underlaying parking slot template, wherein the extracted one or more parameters are used to select one or more predefined parking lot layout models retrieved from a database to determine the one or more layout models for the parking area;
  assign to each of the determined layout models a confidence score, the confidence score indicating how the respective underlaying parking slot template matches the one or more parameters associated with the parking slots identified from the environmental information; and
  select the layout model of the parking area having the highest confidence score as a current layout model used to determine the parking area layout;
  update only the selected current layout model over time based on the confidence scores assigned to the layout models generated from sensing data collected while the vehicle is moving; and
  based on the updated layout model for the parking area, at least one of (a) automatically drive the vehicle within the parking area and (b) automatically park the vehicle within a parking slot within the parking area.

15. The computing system according to claim 14, further comprising:
  a vehicle.

* * * * *